US009396405B2

(12) United States Patent
Tanaka

(10) Patent No.: US 9,396,405 B2
(45) Date of Patent: Jul. 19, 2016

(54) IMAGE PROCESSING APPARATUS, IMAGE PROCESSING METHOD, AND IMAGE PROCESSING PROGRAM

(75) Inventor: Aki Tanaka, Kanagawa (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/343,027

(22) PCT Filed: Aug. 20, 2012

(86) PCT No.: PCT/JP2012/070973
§ 371 (c)(1),
(2), (4) Date: Mar. 5, 2014

(87) PCT Pub. No.: WO2013/038872
PCT Pub. Date: Mar. 21, 2013

(65) Prior Publication Data
US 2014/0226037 A1 Aug. 14, 2014

(30) Foreign Application Priority Data

Sep. 16, 2011 (JP) ................................ 2011-202860

(51) Int. Cl.
*H04N 5/228* (2006.01)
*G06K 9/20* (2006.01)
(Continued)

(52) U.S. Cl.
CPC .......... *G06K 9/2081* (2013.01); *G06F 3/04886* (2013.01); *G06K 9/228* (2013.01);
(Continued)

(58) Field of Classification Search
CPC .............. H04N 5/232; H04N 5/23229; H04N 5/23293; G06K 9/228; G06K 9/2081
USPC ................................ 382/176, 181; 348/222.1
IPC .. H04N 5/232, 5/23229, 5/23293; G06K 9/228, G06K 9/2081
See application file for complete search history.

(56) References Cited

U.S. PATENT DOCUMENTS 6,625,313 B1 9/2003 Morita et al.
6,947,596 B2 * 9/2005 Kashioka et al. ............. 382/186
(Continued)

FOREIGN PATENT DOCUMENTS

JP 06-119486 4/1994
JP 07-028946 1/1995
(Continued)

OTHER PUBLICATIONS

International Search Report corresponding to PCT/JP2012/070973 dated Sep. 25, 2012; 2 pages.
(Continued)

*Primary Examiner* — Yogesh Aggarwal
(74) *Attorney, Agent, or Firm* — Wilmer Cutler Pickering Hale and Dorr LLP

(57) ABSTRACT

There are provided an operation unit configured to detect a designation area designated on a display screen of a display unit, a specifying unit configured to acquire designation area image position information representing a position corresponding to the designation area in a camera image for each detected designation area, an image segmentation processing unit configured to segment an image corresponding to the designation area from the camera image based on the designation area image position information, a memory unit configured to save image data of the image corresponding to the designation area segmented from the camera image, and a processing control unit configured to activate each of the specifying unit configured to acquire the designation area image position information of the designation area and the processing unit configured to segment the image corresponding to the designation area to be executed for each designation area when the designation area has been designated.

7 Claims, 7 Drawing Sheets

(51) Int. Cl.
 *H04N 5/232* (2006.01)
 *G06K 9/22* (2006.01)
 *G06F 3/0488* (2013.01)

(52) U.S. Cl.
 CPC ....... *H04N5/23229* (2013.01); *H04N 5/23293* (2013.01); *G06F 2203/04803* (2013.01); *G06K 2209/01* (2013.01)

(56) References Cited

U.S. PATENT DOCUMENTS

| | | |
|---|---|---|
| 2003/0076994 A1 | 4/2003 | Morita et al. |
| 2003/0076995 A1 | 4/2003 | Morita et al. |
| 2005/0116945 A1 | 6/2005 | Mochizuki et al. |
| 2007/0104367 A1 | 5/2007 | Nankai et al. |
| 2008/0267504 A1* | 10/2008 | Schloter et al. ............... 382/181 |
| 2011/0019239 A1* | 1/2011 | Kojima ................. G06F 3/0488 358/401 |

FOREIGN PATENT DOCUMENTS

| | | |
|---|---|---|
| JP | 2000-251012 | 9/2000 |
| JP | 2002-352190 | 12/2002 |
| JP | 2004-206548 | 7/2004 |
| JP | 2007-133701 | 5/2007 |
| JP | 2010-244211 | 10/2010 |

OTHER PUBLICATIONS

Supplementary European Search Report corresponding to European Application No. 12832626.1, dated Jun. 1, 2015, 7 pages.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This application is a national stage application of International Application No. PCT/JP2012/070973 entitled "IMAGE PROCESSING APPARATUS, IMAGE PROCESSING METHOD, AND IMAGE PROCESSING PROGRAM," filed on Aug. 20, 2012, which claims the benefit of the priority of Japanese Patent Application No. 2011-202860, filed Sep. 16, 2011, the disclosures of each of which are hereby incorporated by reference in their entirety.

TECHNICAL FIELD

The present invention relates to an image processing apparatus, an image processing method, and an image processing program.

BACKGROUND ART

There is an image information processing apparatus which recognizes a character string within an image based on the image captured by a camera and converts the recognized character string into text data (for example, see Patent Document 1).

This image information processing apparatus determines whether a recognition target is appropriate as an image used to recognize a character string and performs a character recognition process on the image obtained by the determination in order to reduce erroneous recognition of a character string due to, for example, camera shake.

DOCUMENTS OF THE PRIOR ART

Patent Document

[Patent Document 1]
Japanese Unexamined Patent Application, First Publication No. 2004-206548

DISCLOSURE OF INVENTION

Problems to be Solved by the Invention

However, when the character recognition process is executed on all images, there is a problem in that the processing load of the overall apparatus increases with the increase of a data processing amount in which the character recognition process should be executed and another process to be performed within the same apparatus is delayed. In this case, there is a problem in that the reaction of the apparatus to an operation instruction from a user is deteriorated and the operability of the apparatus is deteriorated.

An object of the present invention is to provide an image processing apparatus, an image processing method, and an image processing program capable of solving the above-described problems.

Means for Solving the Problem

The present invention has been made to solve the above-described problems, and an image processing apparatus in an embodiment of the present invention includes: a camera configured to acquire image data by photoelectrically converting an optical image incident from a lens; a display unit configured to display a camera image based on the image data; an operation unit configured to detect a designation area designated on a display screen of the display unit; a specifying unit configured to acquire designation area image position information representing a position of an image corresponding to the designation area in the camera image for each detected designation area; an image segmentation processing unit configured to segment the image corresponding to the designation area from the camera image based on the designation area image position information; a memory unit configured to save image data of a segment image corresponding to the designation area segmented from the camera image; and a processing control unit configured to cause each of a program constituting the specifying unit configured to acquire the designation area image position information of the designation area and a program constituting the image segmentation processing unit configured to segment the image corresponding to the designation area to be executed for each designation area when the designation area has been designated.

The present invention has been made to solve the above-described problems, and an image processing method in an embodiment of the present invention includes the steps of: acquiring image data by photoelectrically converting an optical image incident from a lens; displaying a camera image based on the image data on a display unit; detecting a designation area designated on a display screen of the display unit; causing each of a program constituting a specifying unit configured to acquire the designation area image position information of the designation area and a program constituting an image segmentation processing unit configured to segment an image corresponding to the designation area to be executed for each designation area when the designation area has been designated; acquiring, by the specifying unit, the designation area image position information representing a position of the image corresponding to the designation area in the camera image; segmenting, by the image segmentation processing unit, the image corresponding to the designation area from the camera image based on the designation area image position information; and saving image data of a segment image corresponding to the designation area segmented from the camera image in a memory unit.

An image processing program in an embodiment of the present invention causes a computer to function as: a camera unit configured to acquire image data by photoelectrically converting an optical image incident from a lens; a display unit configured to display a camera image based on the image data; an operation unit configured to detect a designation area designated on a display screen of the display unit; a specifying unit configured to acquire designation area image position information representing a position of an image corresponding to the designation area in the camera image for each detected designation area; an image segmentation processing unit configured to segment the image corresponding to the designation area from the camera image based on the designation area image position information; a memory unit configured to save image data of a segment image corresponding to the designation area segmented from the camera image; and a processing control unit configured to cause each of a program constituting the specifying unit configured to acquire the designation area image position information of the designation area and a program constituting the image segmentation processing unit configured to segment the image corresponding to the designation area to be executed for each designation area when the designation area has been designated.

Effects of the Invention

According to image processing related to the present invention, the operability of a user can be improved when an image recognition process is executed on an image captured by a camera.

EMBODIMENTS FOR CARRYING OUT THE INVENTION

Figure 1:
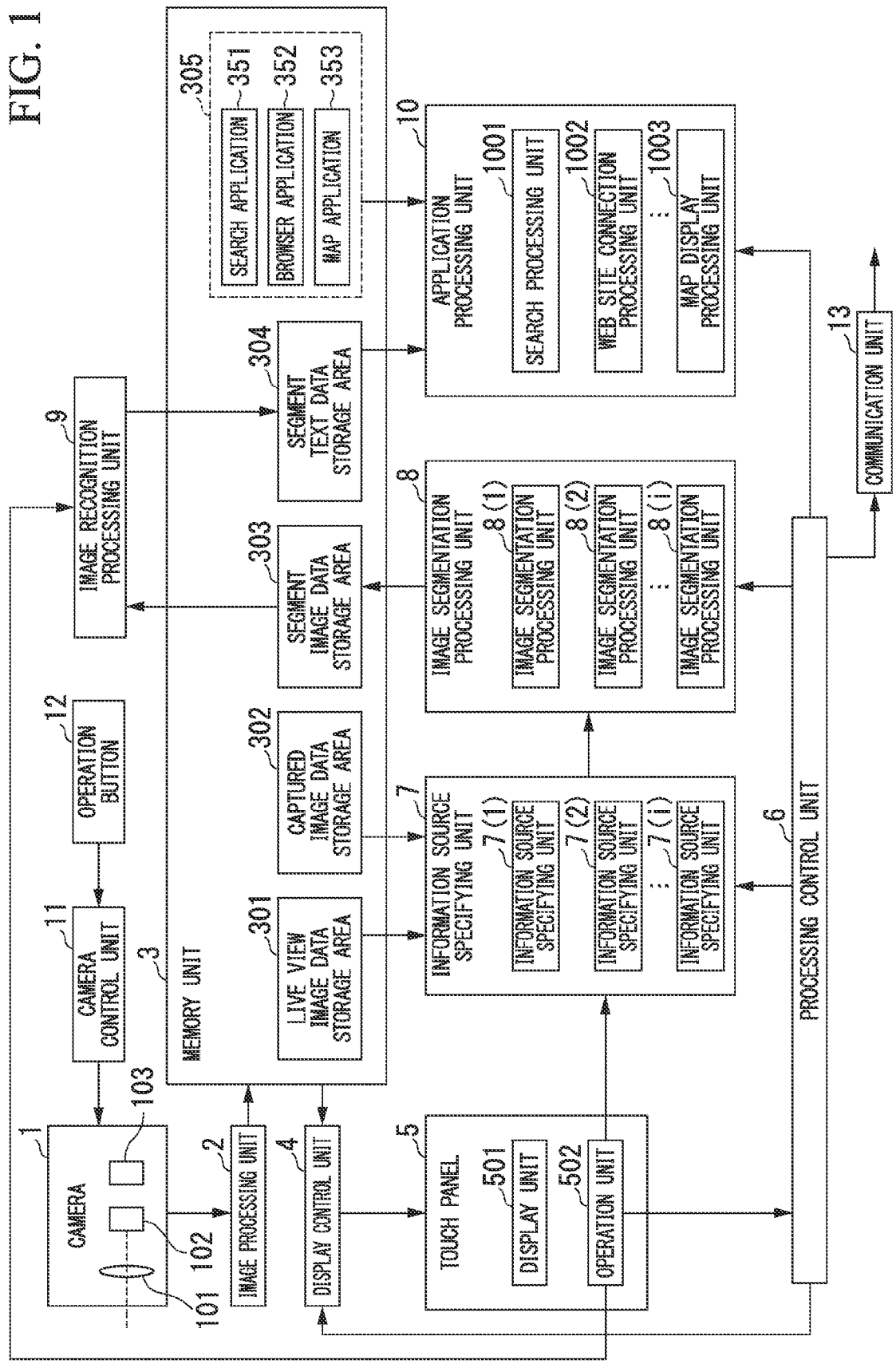
FIG. 1 is a block diagram illustrating an example of a configuration of an information processing apparatus (portable terminal) according to an embodiment of the present invention.

Hereinafter, an embodiment of the present invention will be described with reference to the drawings. FIG. 1 is a diagram illustrating an outline of an information processing apparatus (portable terminal) according to the embodiment of the present invention. Also, in the embodiment of the present invention, an example in which the information processing apparatus is a portable terminal with a camera will be described hereinafter. However, the present invention is not limited thereto. The information processing apparatus may be a smartphone, a portable game machine, a tablet type personal computer (PC), a notebook type PC, or the like.

When an execution target area (hereinafter referred to as a designation area) of an image recognition process for a live view captured by a camera is designated by a user, the portable terminal 100 according to the embodiment of the present invention segments an image corresponding to the designation area designated by the user from the live view and saves the segmented image in a memory unit. Then, when an instruction for the image recognition process on the segmented image (hereinafter referred to as a segment image) has been issued, the segment image is read from the memory unit and the image recognition process is executed. Also, the live view is a video input from a lens of the camera and is a video displayed on a monitor based on image data continuously output by an imaging element based on an optical image incident on the lens.

Also, although the embodiment of the present invention will be described below using an example in which the portable terminal 100 segments the segment image from the live view, the present invention is not limited thereto. For example, in a state in which a shutter button is pressed and a captured image is reproduced, the portable terminal 100 may segment a designation area designated on the captured image.

As illustrated in FIG. 1, the portable terminal 100 according to the embodiment of the present invention includes a camera 1, an image processing unit 2, a memory unit 3, a display control unit 4, a touch panel 5, a processing control unit 6, an information source specifying unit 7, an image segmentation processing unit 8, an image recognition processing unit 9, an application processing unit 10, a camera control unit 11, an operation button 12, and a communication unit 13. Also, the touch panel 5 includes a display unit 501 and an operation unit 502.

The camera 1 includes an optical system 101, an imaging element 102 configured to generate image data from an optical image incident via the optical system 101, and an analog-to-digital (A/D) conversion unit 103 configured to convert an analog signal of image data output from the imaging element 102 into a digital signal and output the digital signal of the image data. For example, when a power source is supplied via a switch button included in the operation button 12, the camera 1, for example, generates image data from the incident optical image and continuously outputs the generated image data to the image processing unit 2. In this manner, the portable terminal 100 displays a live view on the display unit 501 of the touch panel 5 based on continuous image data generated in a state in which the camera 1 can perform imaging. The user can determine an image to be captured while viewing the live view.

The image processing unit 2 executes image processing on image data output from the camera 1 and saves the image data after the image processing in a live view image data storage area 301 of the memory unit 3.

The memory unit 3 saves data of a program or application to be used in each process of the portable terminal 100 and temporarily saves information to be used in various types of processes of the portable terminal 100. In the portable terminal according to the embodiment of the present invention, the memory unit 3 includes the live view image data storage area 301, a captured image data storage area 302, a segment image data storage area 303, a segment text data storage area 304, and an application storage area 305.

The live view image data storage area 301 is a storage area in which image data of a live view acquired by the camera 1 is temporarily saved.

The captured image data storage area 302 is a storage area in which image data of a captured image captured by the camera 1 is saved by the user pressing a shutter button included in the operation button 12.

The segment image data storage area 303 is a storage area in which the segment image segmented by the image segmentation processing unit 8 is saved.

The segment text data storage area 304 is a storage area in which a recognition result representing image content of the segment image on which the image recognition processing unit 9 has performed image recognition is saved.

The application storage area 305 is a storage area in which an application installed by the portable terminal 100 is saved.

The display control unit 4 controls the display unit 501 of the touch panel 5. For example, the display control unit 4 controls the display unit 501 to display a segment image segmented by the image segmentation processing unit 8 on one screen along with a live view. In addition, when the segment image becomes a target of the image recognition process by the image recognition processing unit 9, the display control unit 4 controls the display unit 501 to perform a display to distinguish each display aspect according to processing progress of the image recognition process. For example, the display control unit 4 displays a peripheral part of a segment image before the image recognition process in red, displays a peripheral part of a segment image during the image recognition process in purple, and displays a peripheral part of a segment image after the image recognition process in blue.

The display unit 501 of the touch panel 5 displays display content according to control of the display control unit 4.

In the portable terminal according to the embodiment of the present invention, the display unit 501 is provided as a display screen of the touch panel 5 integrally with the operation unit 502. The display screen of the display unit 501 also functions as an operation screen when the operation unit 502 receives an operation. Also, an XY coordinate system in which a predetermined reference point (for example, the top left corner of the screen) is designated as the origin is defined on the display screen of the display unit 501. In the portable terminal according to the embodiment of the present invention, a coordinate value (X, Y) in the XY coordinate system is allocated for each pixel included in the display unit 501. Also, the XY coordinate system in the display screen of the display unit 501 is consistent with that of the operation screen.

The operation unit 502 of the touch panel 5 includes a sensor configured to receive an operation from the user, and outputs a detection result by the sensor to the processing control unit 6, the information source specifying unit 7, and the image recognition processing unit 9. In the portable terminal according to the embodiment of the present invention, the operation unit 502 detects a contact position of the user's finger in contact with the display screen of the display unit 501 using the sensor at predetermined fixed time intervals and outputs a detection result of the sensor. Also, the contact position of the user's finger is represented by a coordinate value of the XY coordinate system in the operation screen (display screen).

Also, the portable terminal according to the present invention is not limited thereto. For example, positions of the user's finger close to the display screen of the display unit 501, an operation instruction unit, etc. may be detected by a non-contact sensor. In addition, the display unit 501 and the operation unit 502 may not be the touch panel 5, and may be an operation unit such as a button or a keyboard connected to a computer, an external keyboard, a display of an external monitor, or the like.

Figure 2A:
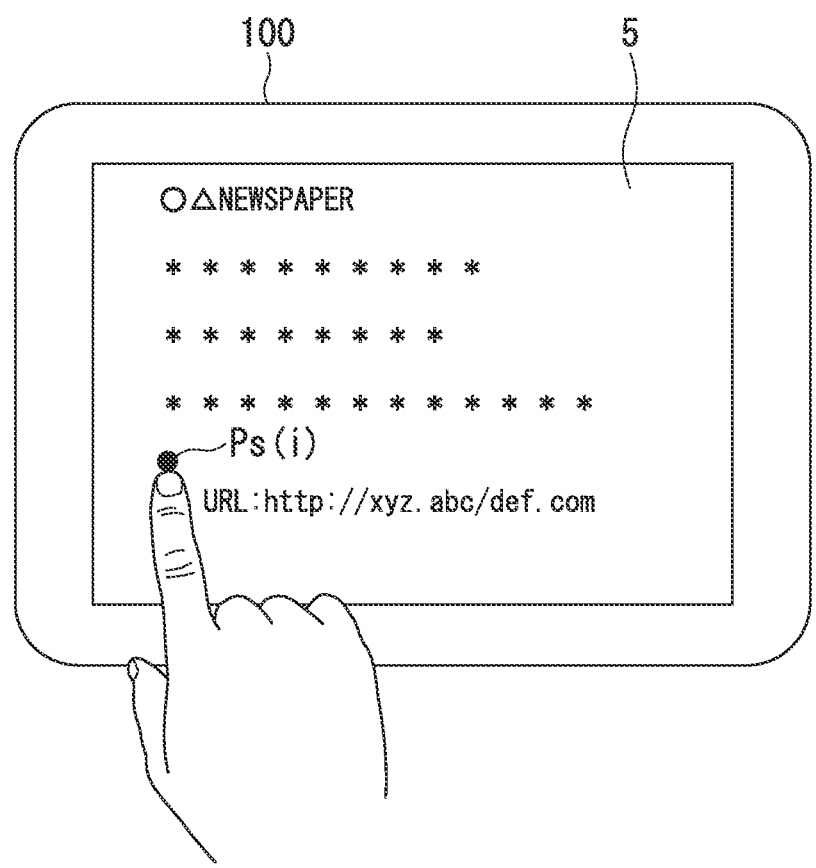
FIG. 2A is a reference diagram illustrating an example of a method by which the information processing apparatus (portable terminal) according to the embodiment of the present invention detects a designation area E(i).
Figure 2B:
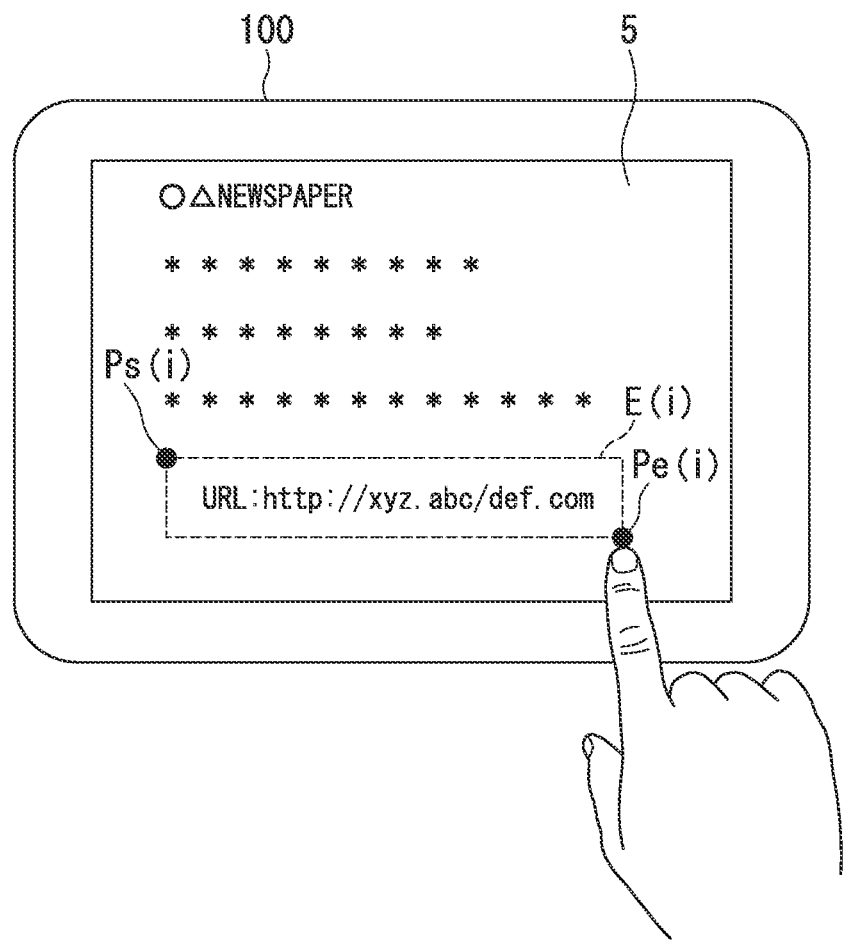
FIG. 2B is a reference diagram illustrating an example of the method by which the information processing apparatus (portable terminal) according to the embodiment of the present invention detects the designation area E(i).

In FIGS. 2A and 2B, reference diagrams each illustrating an example of a method by which the information processing apparatus (portable terminal) according to the embodiment of the present invention detects a designation area E(i) are illustrated.

The processing control unit 6 determines whether the designation area E(i) has been designated based on the detection result of the sensor of the operation unit 502. Also, i is an identification number which distinguishes each designation area. Upon determining that the designation area E(i) has been designated, the processing control unit 6 may allocate a different identification number i to each designation area E(i).

For example, upon detecting that the finger is in contact with the display screen of the touch panel 5 based on the detection result of the operation unit 502 of the touch panel 5, this processing control unit 6 determines that a touch operation has been input. In addition, based on the detection result of the operation unit 502 of the touch panel 5, the processing control unit 6 determines that a slide operation has been input upon detecting that the finger has been moved in a state in which the finger is in contact with the display screen of the touch panel 5. Further, based on the detection result of the operation unit 502 of the touch panel 5, the processing control unit 6 determines that a touch release operation has been input upon detecting that the finger has been separated from the display screen in a state in which the finger was in contact with the display screen of the touch panel 5.

In addition, upon determining that the touch operation has been input, the processing control unit 6 determines that a start point Ps(i) of the designation area E(i) has been designated and acquires a position in the display screen to which the touch operation has been input as a position of the start point Ps(i) (FIG. 2A). This processing control unit 6 detects an XY coordinate value $(Xs_i, Ys_i)$ representing the position in the display screen of the detected start point Ps(i).

Further, upon determining that the touch release operation has been input, the processing control unit 6 determines that an end point Pe(i) of the designation area E(i) has been designated and acquires a position in the display screen to which the touch release operation has been input as a position of the end point Pe(i). This processing control unit 6 detects an XY coordinate value $(Xs_i, Ys_i)$ representing the position in the display screen of the detected end point Pe(i) (FIG. 2B).

For example, upon detecting the start point Ps(i) and the end point Pe(i) of the designation area E(i), this processing control unit 6 determines a rectangular area in which the start point Ps(i) and the end point Pe(i) serve as vertices on a diagonal line as the designation area E(i). That is, the processing control unit 6 determines that the designation area E(i) has been designated by determining that the start point Ps(i) and the end point Pe(i) have been designated. Also, the present invention is not limited thereto. The processing control unit 6 may detect an area which includes the start point Ps(i) and the end point Pe(i) in both ends and is determined according to pressure of the finger in contact with a display surface of the touch panel 5 or a thickness of the finger and a length in which a slide operation has been input as the designation area E(i).

Furthermore, upon determining that the designation area E(i) has been designated, the processing control unit 6 executes a program constituting an $(i)^{th}$ information source specifying unit 7($i$) used to detect designation area image position information J(i) representing a position of an image corresponding to the designation area E(i) in a live view. Thereby, a processing unit which functions as the $(i)^{th}$ information source specifying unit 7($i$) starts up (is activated). In other words, when the designation area E(i) has been designated, this processing control unit 6 executes a program constituting the information source specifying unit 7($i$) for each designated designation area E(i). Thereby, each information source specifying unit 7($i$) can independently detect designation area image position information J(i) representing a position on a live view of an image corresponding to the designation area E(i).

In addition, upon determining that the designation area E(i) has been designated, the processing control unit 6 executes a program constituting an $(i)^{th}$ image segmentation processing unit 8($i$) which segments a segment image G(i) corresponding to the designation area E(i). In other words, when the designation area E(i) has been designated, this processing control unit 6 executes a program constituting the image segmentation processing unit 8($i$) for each designated designation area E(i). Thereby, each image segmentation processing unit 8($i$) can independently segment the segment image G(i) corresponding to the designation area E(i).

The information source designation unit 7 acquires designation area image position information J(i) representing a position of the segment image G(i) on the live view corresponding to the designation area E(i) based on the XY coordinate value $(Xs_i, Ys_i)$ of the start point Ps(i) and the XY coordinate value $(Xe_i, Ye_i)$ of the end point Pe(i) of the designation area E(i) detected by the processing control unit 6.

This information source specifying unit 7 includes information source specifying units 7(i) activated by the processing control unit 6 for every designation area E(i). The respective information source specifying units 7(i) can execute a process of detecting the above-described designation area image position information J(i) in parallel.

The image segmentation processing unit 8 segments the segment image G(i) corresponding to the designation area E(i) from image data of the live view corresponding to the designation area E(i) based on the designation area image position information J(i) acquired by the information source specifying unit 7(i). Also, the live view is a video to be displayed based on a plurality of pieces of continuous image data. When the designation area E(i) is designated, the display unit 501 of the touch panel 5 displays the live view by sequentially displaying images acquired in time series one by one. Consequently, an image based on a plurality of pieces of image data is displayed on the display unit 501 of the touch panel 5 from when the start point Ps(i) is designated to when the end point Pe(i) is designated.

In the embodiment of the present invention, the image segmentation processing unit 8 segments the segment image G(i) from the image data of the live view displayed on the display unit 501 when the end point Pe(i) has been detected among the plurality of pieces of image data of the live view displayed on the display unit 501 when the designation area E(i) has been designated. Also, the present invention is not limited thereto. For example, the image segmentation processing unit 8 may segment the segment image G(i) from image data with largest contrast among the plurality of pieces of image data displayed on the display unit 501 of the touch panel 5 from when the start point Ps(i) is designated to when the end point Pe(i) is designated.

This image segmentation processing unit 8 includes image segmentation processing units 8(i) activated by the processing control unit 6. The respective image segmentation processing units 8(i) can execute a process of segmenting the above-described segment image G(i) in parallel.

For example, when an instruction has been issued to execute an image recognition process on the segment image G(i) designated via the operation unit 502, the image recognition processing unit 9 reads the designated segment image G(i) from a segment text data storage area 304 of the memory unit 3. In this manner, it is also possible to instruct the image segmentation processing unit 8 to execute an image segmentation operation during a recognition process by the image recognition processing unit 9 by executing the operation of the image recognition processing unit 9 independent of a process of the image segmentation processing unit 8.

Also, when a predetermined timing has been reached, the image recognition processing unit 9 may automatically execute the image recognition process. For example, during an operation in which a processing load is low such as a state in which a shooting operation by the camera 1 is not executed, the image recognition process may be predetermined to be executed. In this case, in the state in which the processing load is low, the image recognition processing unit 9 may be an image recognition processing unit which sequentially reads the image segment image G(i) on which the image recognition process is not executed from the segment text data storage area 304.

In addition, the image recognition processing unit 9 may be an image recognition processing unit which executes an image recognition process on an image segment image G(i) on which the image recognition process has not been executed read from the segment text data storage area 304 at a predetermined timing as follows. This predetermined timing, for example, may be a timing at which shooting by the camera 1 stops or ends. In addition, it may be a timing at which the image segmentation operation is not input for a predetermined time or more and the image segmentation process by the image segmentation processing unit 8 is not executed for a predetermined time or more. Further, it may be a timing at which the user has performed a predetermined operation on the segment image G(i) segmented by the image segmentation processing unit 8. For example, there is a case in which the user has issued an operation instruction to display the segment image G(i) on the display unit 501 of the touch panel 5, a case in which display magnification of the displayed segment image G(i) has been enlarged or reduced, or the like. Furthermore, it may be a timing at which a predetermined time or more has elapsed after the image segmentation process by the image segmentation processing unit 8 has been executed. In addition, it may be a timing at which the application processing unit 10 uses the segment image G(i) according to another application.

In addition, the image recognition processing unit 9 executes an image recognition process on the read segment image G(i). For example, the image recognition processing unit 9 matches predetermined pattern data against the segment image G(i), recognizes a character string (including hiragana, katakana, kanji, letters, numbers, etc.) included in the segment image G(i), and extracts text data of the recognized character string. Hereinafter, information representing image content of the segment image G(i) acquired by the image recognition processing unit 9 according to the image recognition process or the text data used here is referred to as a recognition result K(i).

Also, the image recognition processing unit 9 may be an image recognition processing unit which performs an image recognition process of recognizing a graphic such as a logo or a pictograph, an image recognition process of reading code information from a one-dimensional code, a two-dimensional code, or the like.

This image recognition processing unit 9 saves the recognition result K(i) acquired by the image recognition process in the segment text data storage area 304 of the memory unit 3.

The application processing unit 10 executes an application stored in the application storage area 305 of the memory unit 3 according to the recognition result K(i) and starts up a processing unit responsible for a process of each application. For example, when the recognition result K(i) has been designated according to a touch operation from the user via the operation unit 502 of the touch panel 5 in a state in which the recognition result K(i) is displayed on the display unit 501 of the touch panel 5, the application processing unit 10 determines that an instruction has been issued to execute the application for the designated recognition result K(i). In this case, the application processing unit 10 executes a predetermined application as an executable application related to the designated recognition result K(i), and starts up a processing unit corresponding to the application.

For example, when the user has designated information representing a character string as the recognition result K(i), the application processing unit 10 executes a search application 351 predetermined as an executable application corresponding to the character string. Thereby, the application processing unit 10 starts up the search processing unit 1001. The search processing unit 1001 transmits information for an instruction used to search for information related to a character string of the designated recognition result K(i) in a keyword search engine to a server (not illustrated) connected by a network via the communication unit 13. Upon receiving the search result by the keyword search engine from the server, the display control unit 4 causes the display unit 501 of the touch panel 5 to display the received search result.

In addition, when the user has designated information representing a uniform resource locator (URL) as the recognition result K(i), the application processing unit 10 executes a browser application 352 predetermined as an executable application corresponding to the URL. Thereby, the application processing unit 10 starts up a WEB site connection processing unit 1002. The WEB site connection processing unit 1002 transmits the URL of the designated recognition result K(i) to a server (not illustrated) connected by a network via the communication unit 13. When a WEB image of a WEB site represented by the URL has been received from the server, the display control unit 4 causes the display unit 50 of the touch panel 5 to display the received WEB image.

Further, when the user has designated information representing a place such as an address, a place name, or a facility name as the recognition result K(i), the application processing unit 10 executes a map application 353 predetermined as an executable application corresponding to the information representing the place. Thereby, the application processing unit 10 starts up a map display processing unit 1003. The map display processing unit 1003 transmits information for an instruction used to search for a place of the designated recognition result K(i) in the map search engine to the server (not illustrated) connected by the network via the communication unit 13. When a search result by the map search engine has been received from the server, the display control unit 4 causes the display unit 501 of the touch panel 5 to display the received search result.

When the shutter button included in the operation button 12 has been pressed, the camera control unit 11 controls the camera 1 so that image data of a captured image is acquired based on an optical image incident on the camera 1. Also, it is preferable that the captured image be an image having higher image quality than the live view.

The operation button 12, for example, is an input unit of an operation from the user including a power-source switch button, a shutter button, or the like. Also, in addition thereto, the operation button 12 may be an operation button including an operation input unit such as a directional pad. This operation button 12 receives an operation from the user and outputs operation information representing the received operation.

The communication unit 13 is communicably connected to an external device such as the server via the network and performs transmission and reception of information.

Next, examples of a method by which the processing control unit 6 according to the embodiment of the present invention detects the designation area E(i) will be described with reference to FIGS. 2A and 2B. FIGS. 2A and 2B are reference diagrams each illustrating an example of the method by which the processing control unit 6 according to the embodiment of the present invention detects the designation area E(i).

When the finger of the user comes in contact with a display screen of the touch panel 5 as illustrated in FIG. 2A, the processing control unit 6 determines that the touch operation has been input and detects the start point Ps(i) of the designation area E(i).

Then, the user causes a slide operation to be performed in a state in which the finger is touching the display screen of the touch panel 5. Thereby, for example, a display is performed on the touch panel 5, for example, by adding color thereto, so that it can be seen that a rectangular area in which a point currently in contact with the user's finger and the start point Ps(i) are vertices on a diagonal line is a user-designated area.

When the user separates the finger from the display screen of the touch panel 5, the processing control unit 6 determines that the touch release operation has been input and detects the end point Pe(i) of the designation area E(i). Thereby, the designation area E(i) is determined. This designation area E(i) is illustrated in FIG. 2B.

Thereby, an image including information representing a URL is designated as the designation area E(i).

Next, an example of a display control method by the display control unit 4 will be described with reference to FIGS. 3A and 3B.

Figure 3A:
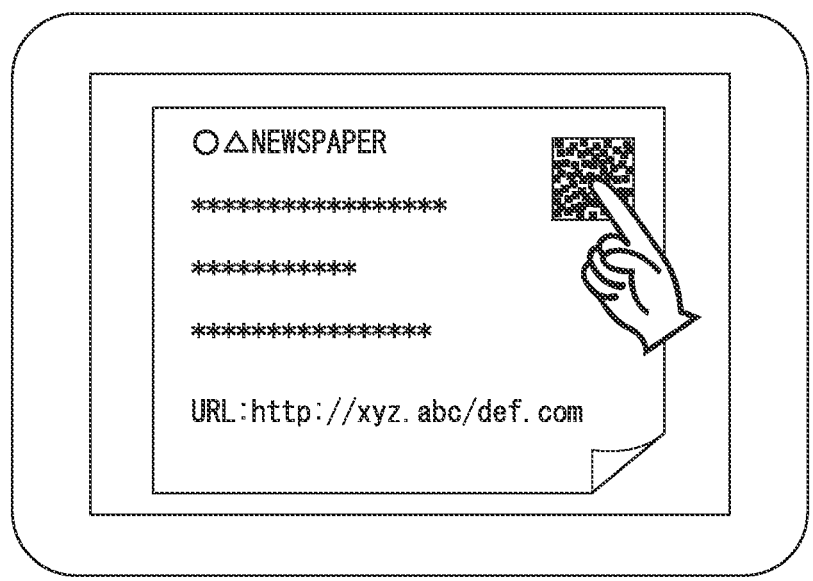
FIG. 3A is a reference diagram illustrating an example of a display control method by the information processing apparatus (portable terminal) according to the embodiment of the present invention.
Figure 3B:
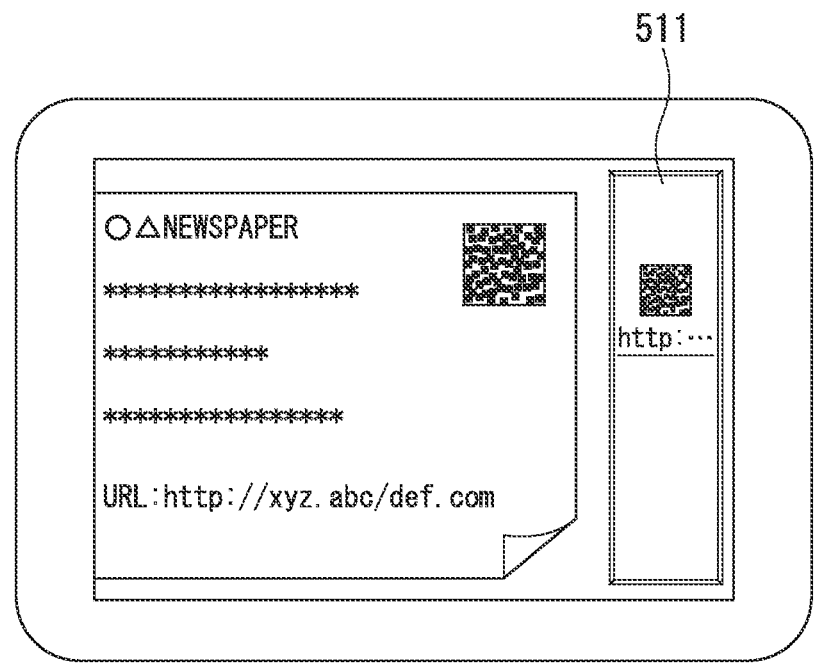
FIG. 3B is a reference diagram illustrating an example of the display control method by the information processing apparatus (portable terminal) according to the embodiment of the present invention.

FIGS. 3A and 3B are reference diagrams illustrating the example of the display control method by the display control unit 4.

As illustrated in FIG. 3A, the user designates the designation area E(i) from the top of the display screen of the touch panel 5 which displays a live view. For example, as described with reference to FIGS. 2A and 2B, the processing control unit 6 detects a rectangular area in which the start point Ps(i) and the end point Pe(i) serve as vertices on a diagonal line. In an illustrated example, the user designates an image including a two-dimensional code as the designation area E(i).

Thereby, the processing control unit 6 executes each of a program constituting the information source specifying unit 7(i) and a program constituting the image segmentation processing unit 8(i) corresponding to the designation area E(i). Thereby, the information source specifying unit 7(i) and the image segmentation processing unit 8(i) start up.

Then, the information source specifying unit 7 detects the designation area image position information J(i) representing a position of an image corresponding to the designation area E(i). The image segmentation processing unit 8 segments the segment image G(i) corresponding to the designation area E(i). Thereby, the segment image G(i) is saved in the segment image data storage area 303 of the memory unit 3.

Subsequently, when the image segmentation processing unit 8(i) has segmented the segment image G(i), the processing control unit 6 notifies the display control unit 4 of the segmentation. Upon receiving the notification representing that the segment image G(i) has been segmented from the processing control unit 6, the display control unit 4 creates a stock segment image display area 511 on which a thumbnail of the segment image G(i) is displayed along with the live view on the display unit 501 of the touch panel 5. An example in which the stock segment image display area 511 is displayed on the touch panel 5 is illustrated in FIG. 3B.

When the designation area E(i) is designated as illustrated in FIG. 3B, the live view and the thumbnail of the segment image G(i) of the designation area E(i) are displayed on the display screen of the touch panel 5.

Also, next, when a designation area E(i+1) including the URL has been designated, the display control unit 4 causes the thumbnail of the segment image G(i) of the designation area E(i) and a thumbnail of a segment image G(i+1) of a designation area E(i+1) to be displayed on the stock segment image display area 511.

In this manner, the user can recognize that the image of the designated designation area E(i) is saved in the memory unit 3 by displaying the thumbnail of the segment image G(i) on the stock segment image display area 511 of the touch panel 5.

In addition, when the thumbnail displayed on the stock segment image display area 511 has been designated according to a touch operation, the image recognition processing unit 9 executes an image recognition process of the segment image G(i) designated by the touch operation.

For example, when the segment image G(i) of the designation area E(i) including a two-dimensional code has been designated, the image recognition processing unit 9 recognizes a figure of the two-dimensional code from the segment image G(i) and reads code information included in the two-dimensional code. Then, the image recognition processing unit 9 saves the read code information as the recognition result K(i) in a segment text data storage area 304 of the memory unit 3.

Here, when the code information read from the two-dimensional code, for example, is a URL of a WEB site of a restaurant, the application processing unit 10 executes the browser application 352 and starts up the WEB site connection processing unit 1002. Then, the WEB site connection processing unit 1002 transmits the URL of the WEB site of the restaurant to the server (not illustrated) connected by the network via the communication unit 13. Then, upon receiving a WEB image of the WEB site represented by the URL from the server, the display control unit 4 causes the received WEB image to be displayed on the touch panel 5.

In this manner, by designating the segment image G(i) displayed on the stock segment image display area 511, the image recognition process by the image recognition processing unit 9 is executed and an application according to an acquired recognition result K(i) is executed. Thereby, it is possible to use information acquired from the designation area E(i) soon after designating the designation area E(i).

Figure 4:
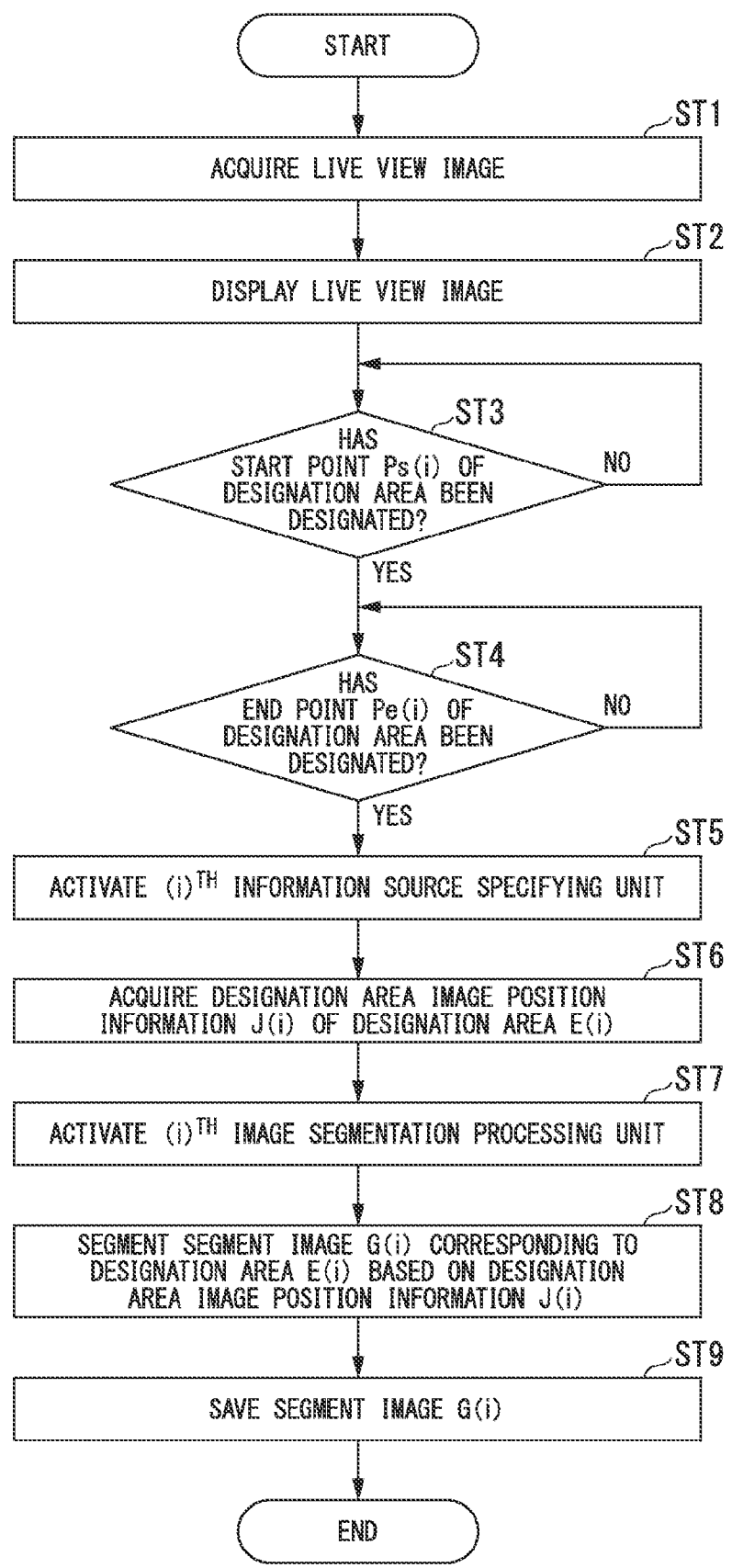
FIG. 4 is a flowchart illustrating an example of a method by which the information processing apparatus (portable terminal) according to the embodiment of the present invention acquires a segment image.

Next, an example in which the portable terminal 100 according to the embodiment of the present invention acquires a segment image will be described with reference to FIG. 4. FIG. 4 is a flowchart illustrating the example in which the portable terminal 100 according to the embodiment of the present invention acquires the segment image.

(Step ST1)

When the operation button 12 is pressed and the power source is turned on in the portable terminal 100, an optical image incident on the optical system 101 of the camera 1 is photoelectrically converted by the imaging element 102 and the photoelectrically converted image is output by the A/D conversion unit 103 as image data. That is, the camera 1 acquires image data of a continuous live view based on the incident optical image.

(Step ST2)

Then, the camera 1 outputs the image data of the live view to the image processing unit 2. The image processing unit 2 converts the input image data into an image size or image quality of a live view and stores the converted image data in the live view image data storage area 301 of the memory unit 3. Then, the display control unit 4 reads the image data of the live view from the live view image data storage area 301 and causes the read image data to be displayed on the display unit 501 of the touch panel 5. Thereby, it is possible to cause the touch panel 5 to display a current video (live view) captured by the camera 1.

(Step ST3)

Subsequently, the operation unit 502 of the touch panel 5 determines whether an operation of designating the start point Ps(i) of the designation area has been received. For example, the operation unit 502 determines whether a touch operation of touching an operation screen of the touch panel 5 has been detected.

(Step ST4)

Upon determining that the operation of designating the start point Ps(i) of the designation area has been received, the processing control unit 6 detects a position $(Xs_i, Ys_i)$ of the start point Ps(i) which is a position of the display screen that the user's finger came in contact with in the touch operation.

In addition, upon determining that the operation of designating the start point Ps(i) of the designation area has been received, the operation unit 502 continuously determines whether an operation of designating the end point Pe(i) of the designation area has been received. For example, after a touch operation of touching the display screen of the touch panel 5 has been detected, the operation unit 502 continuously determines whether the slide operation for movement has been detected in a state in which the finger is touching the display screen and the touch release operation in which the finger in the touching state is separated from the display screen has been further detected.

(Step ST5)

Upon determining that an operation of designating the end point Pe(i) of the designation area has been received, the processing control unit 6 detects a position $(Xe_i, Ye_i)$ of the end point Pe(i) which is a position at which the finger in the touching state is separated from the display screen.

In addition, when the start point Ps(i) and the end point Pe(i) have been detected, the processing control unit 6 executes a program constituting the $(i)^{th}$ information source specifying unit 7(i) used to detect the designation area image position information J(i) representing a position of an image on a live view corresponding to the designation area E(i) defined by the start point Ps(i) and the end point Pe(i). Thereby, the information source specifying unit 7(i) is activated.

(Step ST6)

Then, the activated information source specifying unit 7(i) acquires the designation area image position information J(i) representing a position of an image corresponding to the designation area E(i) in the live view. For example, the information source specifying unit 7(i) acquires a position $(x1_i, y1_i)$ of a first vertex P1(i) corresponding to the start point Ps(i) on the live view based on the position $(Xs_i, Ys_i)$ of the start point Ps(i) on the display screen acquired by the processing control unit 6. In addition, the information source specifying unit 7(i) acquires a position $(x2_i, y2_i)$ of a second vertex P2(i) corresponding to the end point Pe(i) on the live view based on the position $(Xe_i, Ye_i)$ of the end point Pe(i) on the display screen acquired by the processing control unit 6.

Then, the information source specifying unit 7(i) acquires the designation area image position information J(i) representing a position of a rectangular image area on the live view in which the first vertex P1(i) and the second vertex P2(i) serve as vertices on a diagonal line. This information source specifying unit 7(i) may be an information source specifying unit which acquires a third vertex P3(i) and a fourth vertex P4(i) different from the first vertex P1(i) and the second vertex P2(i). In the embodiment of the present invention, the third vertex P3(i) is a vertex adjacent to the first vertex P1(i) and the second vertex P2(i) and its coordinate value is $(x1_i, y2_i)$. In addition, the fourth vertex P4(i) is a vertex adjacent to the first vertex P1(i) and the second vertex P2(i) and its coordinate value is $(x2_i, y1_i)$.

The information source specifying unit 7(i) outputs the coordinate value $(x1_i, y1_i)$ of the first vertex P1(i), the coordinate value (x2$_i$, y2$_i$) of the second vertex P2(i), and the coordinate value (x1$_i$, y2$_i$) of the third vertex P3(i), and the coordinate value (x2$_i$, y1$_i$) of the fourth vertex P4(i) as the designation area image position information J(i) of the designation area E(i) to the image segmentation processing unit 8(i).

(Step ST7)

In addition, when the start point Ps(i) and the end point Pe(i) have been detected, the processing control unit 6 executes a program constituting the (i)$^{th}$ image segmentation processing unit 8(i) used to segment the segment image G(i) corresponding to the designation area E(i) defined by the start point Ps(i) and the end point Pe(i). Thereby, the image segmentation processing unit 8(i) is activated.

(Step ST8)

Then, the activated image segmentation processing unit 8(i) segments the segment image G(i) from the live view based on the designation area image position information J(i) acquired by the information source specifying unit 7(i). Also, in the embodiment of the present invention, the image segmentation processing unit 8(i) segments the segment image G(i) from the live view from which the end point Pe(i) has been detected.

(Step ST9)

Subsequently, the image segmentation processing unit 8 saves the segmented segment image G(i) in the segment text data storage area 304 of the memory unit 3.

Figure 5:
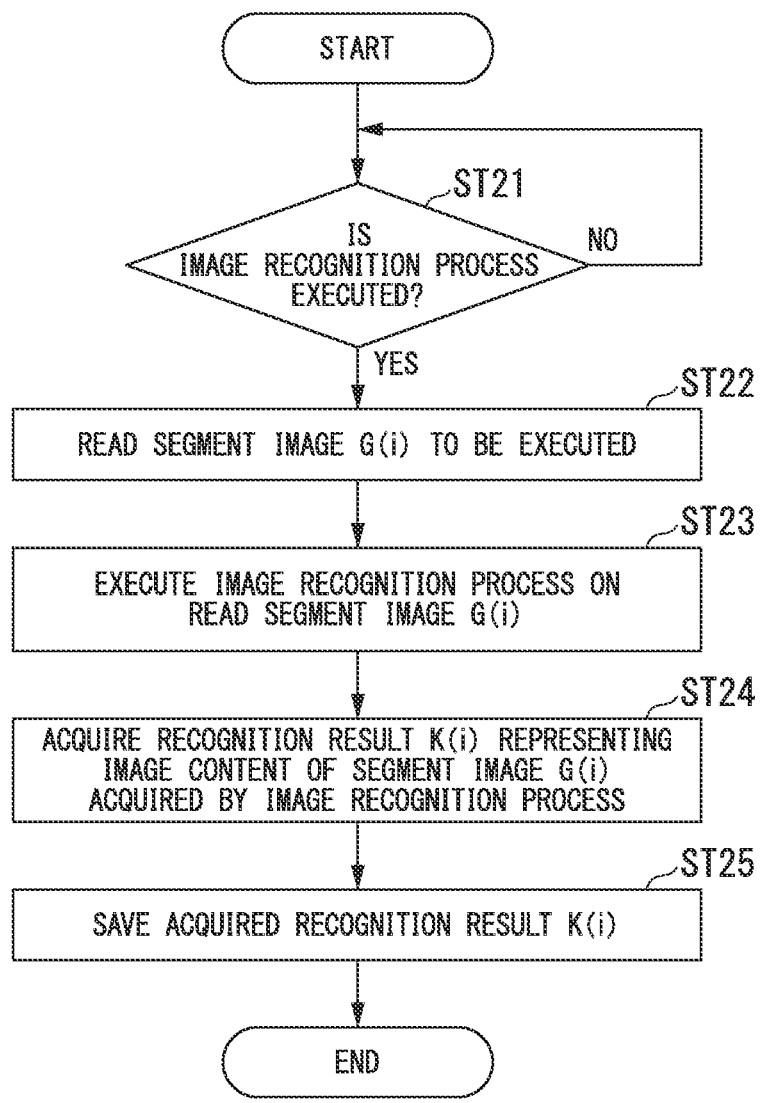
FIG. 5 is a flowchart illustrating an example of an image recognition processing method by the information processing apparatus (portable terminal) according to the embodiment of the present invention.

Next, an example of an image recognition processing method by the portable terminal 100 according to the embodiment of the present invention will be described with reference to FIG. 5. FIG. 5 is a flowchart illustrating the example of the image recognition processing method by the portable terminal 100 according to the embodiment of the present invention.

(Step ST21)

The image recognition processing unit 9 determines whether to perform the image recognition process. For example, when an instruction to execute the image recognition process on the segment image G(i) designated via the operation unit 502 has been issued, the image recognition processing unit 9 determines to perform the image recognition process.

(Step ST22)

Then, upon determining that the instruction to execute the image recognition process has been issued, the image recognition processing unit 9 reads the designated segment image G(i) from the segment text data storage area 304.

(Step ST23)

Next, the image recognition processing unit 9 executes the image recognition process on the read segment image G(i). For example, the image recognition processing unit 9 executes the image recognition process of recognizing a character included in the segment image G(i).

(Step ST24)

Then, the image recognition processing unit 9 extracts a character string included in the segment image G(i) according to the image recognition process, and acquires the extracted character string as a recognition result K(i).

(Step ST25)

Subsequently, the image recognition processing unit 9 saves the acquired recognition result K(i) in the segment text data storage area 304 of the memory unit 3.

In this manner, the portable terminal 100 according to the embodiment of the present invention segments the segment image G(i) corresponding to the designation area E(i) designated in the live view and saves the segmented segment image G(i) in the segment image data storage area 303 of the memory unit 3. In addition, when the processing control unit 6 determines that the designation area E(i) has been designated, the information source specifying unit 7 executes a program constituting the information source specifying unit 7(i) for each designation area E(i). Further, when the processing control unit 6 determines that the designation area E(i) has been designated, the image segmentation processing unit 8 executes a program constituting the image segmentation processing unit 8(i) for each designation area E(i).

Thereby, before a process of segmenting the segment image G(i) of the designation area E(i) is completed, the portable terminal 100 can execute processes until the segment image G(i) is segmented in parallel for every designation area E(i) and E(i+1) even when the next designation area E(i+1) has been designated. Consequently, even when a plurality of designation areas E(i) have been continuously designated, it is possible to save the segment image G(i) in the memory unit 3 by continuously receiving the designation of the designation area E(i) from the user.

In addition, the portable terminal 100 according to the embodiment of the present invention saves the segment image G(i) corresponding to the designation area E(i) in the segment image data storage area 303 of the memory unit 3. In addition, when a timing of executing the image recognition process has been reached, the image recognition processing unit 9 sequentially executes the image recognition process on the segment image G(i) read from the segment image data storage area 303. Thereby, even when the user has not yet determined whether to execute the image recognition process, it is possible to save the designated segment image G(i) by immediately designating an image including an information source which is necessary thereafter. Consequently, the user can more easily use the portable terminal 100 which executes the image recognition process using a camera.

In addition, the portable terminal 100 according to this embodiment internally has a computer system. Thus, operation processes may be stored in a computer-readable recording medium in the form of a program, and the above-described processes are performed by causing the computer system to read and execute the program. The "computer system" used here is a computer system including a CPU, various memories, an operating system (OS), and hardware such as peripheral devices.

In addition, the "computer system" is assumed to include a homepage providing environment (or displaying environment) when a World Wide Web (WWW) system is used.

The "computer-readable recording medium" refers to a storage device, including a flexible disk, a magneto-optical disc, a read only memory (ROM), a writable nonvolatile memory such as a flash memory, a portable medium such as a compact disc (CD)-ROM, and a hard disk embedded in the computer system.

In addition, the "computer-readable recording medium" may include a medium that holds a program for a constant period of time, such as a volatile memory (e.g., dynamic random access memory (DRAM)) inside a computer system serving as a server or a client when the program is transmitted via a network such as the Internet or a communication line such as a telephone line.

In addition, the above-described program may be transmitted from a computer system storing the program in a storage device or the like via a transmission medium or transmitted to another computer system by transmission waves in a transmission medium. Here, the "transmission medium" refers to a medium having a function of transmitting information, such as a network (communication network) like the Internet or a communication circuit (communication line) like a telephone line.

In addition, the above-described program may be a program used to implement some of the above-described functions.

Further, the above-described program may be a program, i.e., a so-called differential file (differential program), capable of implementing the above-described functions in combination with a program already recorded on the computer system.

Priority is claimed on Japanese Patent Application No. 2011-202860, filed Sep. 16, 2011, the content of which is incorporated herein by reference.

INDUSTRIAL APPLICABILITY

According to an image processing apparatus related to the present invention, it is possible to improve operability of a user when an image recognition process is executed on an image captured by a camera.

DESCRIPTION OF REFERENCE SYMBOLS

1 Camera
2 Image processing apparatus
3 Memory unit
4 Display control unit
5 Touch panel
6 Processing control unit
7 Information source specifying unit
8 Image segmentation processing unit
9 Image recognition processing unit
10 Application processing unit
11 Camera control unit
12 Operation button
100 Portable terminal

The invention claimed is:

1. An image processing apparatus comprising:
a camera configured to acquire image data by photoelectrically converting an optical image incident from a lens;
a display unit configured to display a camera image based on the image data;
an operation unit configured to detect a designation area designated on a display screen of the display unit;
a specifying unit configured to acquire designation area image position information representing a position of an image corresponding to the designation area in the camera image for each detected designation area;
an image segmentation processing unit configured to segment the image corresponding to the designation area from the camera image based on the designation area image position information;
a memory unit configured to save image data of a segment image corresponding to the designation area segmented from the camera image;
a processing control unit configured to cause each of a program constituting the specifying unit configured to acquire the designation area image position information of the designation area and a program constituting the image segmentation processing unit configured to segment the image corresponding to the designation area to be executed for each designation area when the designation area has been designated,
wherein the designation area is determined on a touch screen having the display unit; and
an image recognition processing unit configured to read the image data designated via the operation unit from among the image data saved in the memory unit and execute an image recognition process of recognizing image content included in the image data,
wherein, when a predetermined timing has been reached, the image recognition processing unit reads the image data that has not been executed by the image recognition process from among the image data saved in the memory unit and executes the image recognition process of recognizing the image content included in the image data.

2. The image processing apparatus according to claim 1, further comprising:
an application processing unit configured to execute an application corresponding to a recognition result by the image recognition processing unit.

3. The image processing apparatus according to claim 1, wherein the image recognition processing unit acquires character information included in the image data based on the image data of the segment image saved in the memory unit.

4. The image processing apparatus according to claim 1, further comprising:
a display control unit configured to control the display unit to display the image segmented by the image segmentation processing unit along with the camera image.

5. The image processing apparatus according to claim 4, wherein, when the image recognition processing unit performs an image recognition process on the segment image segmented by the image segmentation processing unit, the display control unit controls the display unit to display an image before the image recognition process, an image during the image recognition process, and an image after the image recognition process so that each display aspect differs according to progress of the image recognition process.

6. An image processing method comprising the steps of:
acquiring image data by photoelectrically converting an optical image incident from a lens;
displaying a camera image based on the image data on a display unit;
detecting a designation area designated on a display screen of the display unit;
causing each of a program constituting a specifying unit configured to acquire the designation area image position information of the designation area and a program constituting an image segmentation processing unit configured to segment an image corresponding to the designation area to be executed for each designation area when the designation area has been designated;
acquiring, by the specifying unit, the designation area image position information representing a position of the image corresponding to the designation area in the camera image;
segmenting, by the image segmentation processing unit, the image corresponding to the designation area from the camera image based on the designation area image position information;
saving image data of a segment image corresponding to the designation area segmented from the camera image in a memory unit, wherein the designation area is determined on a touch screen having the display unit;
reading the image data designated from among the saved image data unit and executing an image recognition process of recognizing image content included in the image data; and
when a predetermined timing has been reached, reading the image data that has not been executed by the image recognition process from among the saved image data and executing the image recognition process of recognizing the image content included in the image data.

7. A non-transitory computer readable recording medium having stored thereon an image processing program that, when executed by a computer, causes the computer to function as:
- a camera unit configured to acquire image data by photoelectrically converting an optical image incident from a lens;
- a display unit configured to display a camera image based on the image data;
- an operation unit configured to detect a designation area designated on a display screen of the display unit;
- a specifying unit configured to acquire designation area image position information representing a position of an image corresponding to the designation area in the camera image for each detected designation area;
- an image segmentation processing unit configured to segment the image corresponding to the designation area from the camera image based on the designation area image position information;
- a memory unit configured to save image data of a segment image corresponding to the designation area segmented from the camera image;
- a processing control unit configured to cause each of a program constituting the specifying unit configured to acquire the designation area image position information of the designation area and a program constituting the image segmentation processing unit configured to segment the image corresponding to the designation area to be executed for each designation area when the designation area has been designated, wherein the designation area is determined on a touch screen having the display unit; and
- an image recognition processing unit configured to read the image data designated via the operation unit from among the image data saved in the memory unit and execute an image recognition process of recognizing image content included in the image data,
- wherein, when a predetermined timing has been reached, the image recognition processing unit reads the image data that has not been executed by the image recognition process from among the image data saved in the memory unit and executes the image recognition process of recognizing the image content included in the image data.

* * * * *